US010643226B2

(12) United States Patent
Gupta et al.

(10) Patent No.: US 10,643,226 B2
(45) Date of Patent: May 5, 2020

(54) TECHNIQUES FOR EXPANDING A TARGET AUDIENCE FOR MESSAGING

(71) Applicant: Microsoft Technology Licensing, LLC, Redmond, WA (US)

(72) Inventors: Rupesh Gupta, Sunnyvale, CA (US); Ravi Kiran Holur Vijay, Mountain View, CA (US); Hsiao-Ping Tseng, Fremont, CA (US); Romer E. Rosales, Burlingame, CA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 1194 days.

(21) Appl. No.: 14/839,020

(22) Filed: Aug. 28, 2015

(65) Prior Publication Data

US 2017/0032396 A1 Feb. 2, 2017

Related U.S. Application Data

(63) Continuation-in-part of application No. 14/814,555, filed on Jul. 31, 2015.

(51) Int. Cl.
| | |
|---|---|
| *G06N 5/04* | (2006.01) |
| *G06N 20/00* | (2019.01) |
| *H04L 12/58* | (2006.01) |
| *H04L 29/08* | (2006.01) |
| *G06Q 30/02* | (2012.01) |
| *G06Q 50/00* | (2012.01) |

(52) U.S. Cl.
CPC ........... *G06Q 30/0203* (2013.01); *G06N 5/04* (2013.01); *G06N 20/00* (2019.01); *G06Q 30/0201* (2013.01); *G06Q 50/01* (2013.01); *H04L 51/32* (2013.01); *H04L 67/2828* (2013.01)

(58) Field of Classification Search
None
See application file for complete search history.

(56) References Cited

U.S. PATENT DOCUMENTS 5,608,410 A * 3/1997 Stilp ..................... G01S 3/46
342/387
8,571,930 B1 * 10/2013 Galperin ............ G06Q 30/0273
705/14.43
9,760,910 B1 * 9/2017 Tuchman ............... G06Q 50/01
(Continued)

OTHER PUBLICATIONS

Barreno, M. et al. (2010). "The security of machine learning". Mach Learn (2010) 81: 121-148. DOI 10.1007/s10994-010-5188-5 (Year: 2010).*

(Continued)

*Primary Examiner* — Kamran Afshar
*Assistant Examiner* — Benjamin J Buss
(74) *Attorney, Agent, or Firm* — Schwegman Lundberg & Woessner, P.A.

(57) ABSTRACT

This disclosure relates to systems and methods that include configuring a machine learning system to train on a plurality of messages transmitted to target groups of an online social networking service, determining a threshold differential and a weight value using responses to the plurality of messages, and send the input message to the target in response to a differential between the expected number of positive responses and the weight multiplied by the expected number of negative responses being greater than the threshold differential.

14 Claims, 11 Drawing Sheets

(56) References Cited

U.S. PATENT DOCUMENTS

| | | | |
|---|---|---|---|
| 9,904,916 B2* | 2/2018 | Engstrom | G06F 16/93 |
| 2007/0078707 A1* | 4/2007 | Axe | G06Q 30/02 |
| | | | 705/14.41 |
| 2011/0238289 A1* | 9/2011 | Lehmann | G01C 21/3438 |
| | | | 706/21 |
| 2014/0006029 A1* | 1/2014 | Stanley | G10L 15/19 |
| | | | 704/254 |
| 2014/0058567 A1* | 2/2014 | Matsuoka | G05D 23/1917 |
| | | | 700/276 |
| 2014/0067943 A1* | 3/2014 | Jackson | G06Q 30/0269 |
| | | | 709/204 |
| 2014/0188615 A1* | 7/2014 | Badenhop | G06Q 30/0267 |
| | | | 705/14.58 |
| 2015/0006286 A1* | 1/2015 | Liu | G06Q 50/01 |
| | | | 705/14.53 |
| 2015/0006294 A1* | 1/2015 | Irmak | G06Q 50/01 |
| | | | 705/14.66 |
| 2015/0213372 A1* | 7/2015 | Shah | H04L 51/32 |
| | | | 706/12 |
| 2016/0034973 A1* | 2/2016 | Soni | G06Q 30/0276 |
| | | | 705/14.66 |
| 2016/0048881 A1* | 2/2016 | Zhou | H04L 67/20 |
| | | | 705/14.66 |
| 2016/0092925 A1* | 3/2016 | Crites | G06Q 30/0246 |
| | | | 705/14.61 |
| 2016/0124925 A1* | 5/2016 | Fleischman | G06F 16/23 |
| | | | 715/738 |
| 2016/0203509 A1* | 7/2016 | Sharp, III | G06Q 30/0244 |
| | | | 705/14.43 |
| 2017/0004582 A1* | 1/2017 | Engstrom | G06F 16/93 |

OTHER PUBLICATIONS

Segall, J. et al. (2012). "Predicting Reddit post popularity". 5 pages. Stanford University. (Year: 2012).*

* cited by examiner

TECHNIQUES FOR EXPANDING A TARGET AUDIENCE FOR MESSAGING

RELATED APPLICATIONS

This application claims the priority benefit of U.S. application Ser. No. 14/814,555, entitled "DETERMINISTIC MESSAGE DISTRIBUTION," filed Jul. 31, 2015, which is hereby incorporated herein by reference in its entirety.

TECHNICAL FIELD

The subject matter disclosed herein generally relates to data processing and, more particularly, to expanding message targets.

BACKGROUND

Providers and administrators of an online social networking service distribute messages to members for a variety of reasons. Conventionally, members of the online social networking service desire communication from the online social networking service regarding membership, event notification, connections, advertisements, promotions, or other aspects of a social network.

However, sending messages to all members may annoy members due to messages not being sufficiently relevant to the member or the member's interests. Therefore, conventionally, messages are transmitted to a limited target of members of the online social networking service. Expanding a target audience for a message can be difficult without transmitting less relevant messages to members of the online social networking service.

BRIEF DESCRIPTION OF THE DRAWINGS

Some embodiments are illustrated by way of example and not limitation in the figures of the accompanying drawings.

DETAILED DESCRIPTION

The description that follows includes systems, methods, techniques, instruction sequences, and computing machine program products that embody illustrative embodiments of the invention described in the present disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

Basic Description

Example methods and systems are directed to expanding message targets. Examples merely typify possible variations. Unless explicitly stated otherwise, components and functions are optional and may be combined or subdivided, and operations may vary in sequence or be combined or subdivided. In the following description, for purposes of explanation, numerous specific details are set forth to provide a thorough understanding of example embodiments. It will be evident to one skilled in the art, however, that the present subject matter may be practiced without these specific details.

Techniques for expanding message targets have been developed that provide for determining outcome probabilities for a given message and determining whether to send the message to a given target based on the outcome probabilities. Therefore, a target expansion system may transmit messages to further targets based on the outcome probabilities indicating that the further targets will respond positively to the message.

In one example, a message is intended for and is transmitted to English speaking members of the online social networking service. However, the system may also expand the message to other regions, even if they do not speak English, if the system determines that the likelihood of a positive response is a threshold differential higher than the likelihood of receiving a negative response. In this way, the system expands a target audience for a member based, at least in part, on positive and negative probabilities and a machine learning system trained on previously sent messages to random members in selected targets. In one example, the target expansion system 150 sends messages to 5% of members in a target group and the machine learning system trains on responses to the sent messages.

Figure 1:
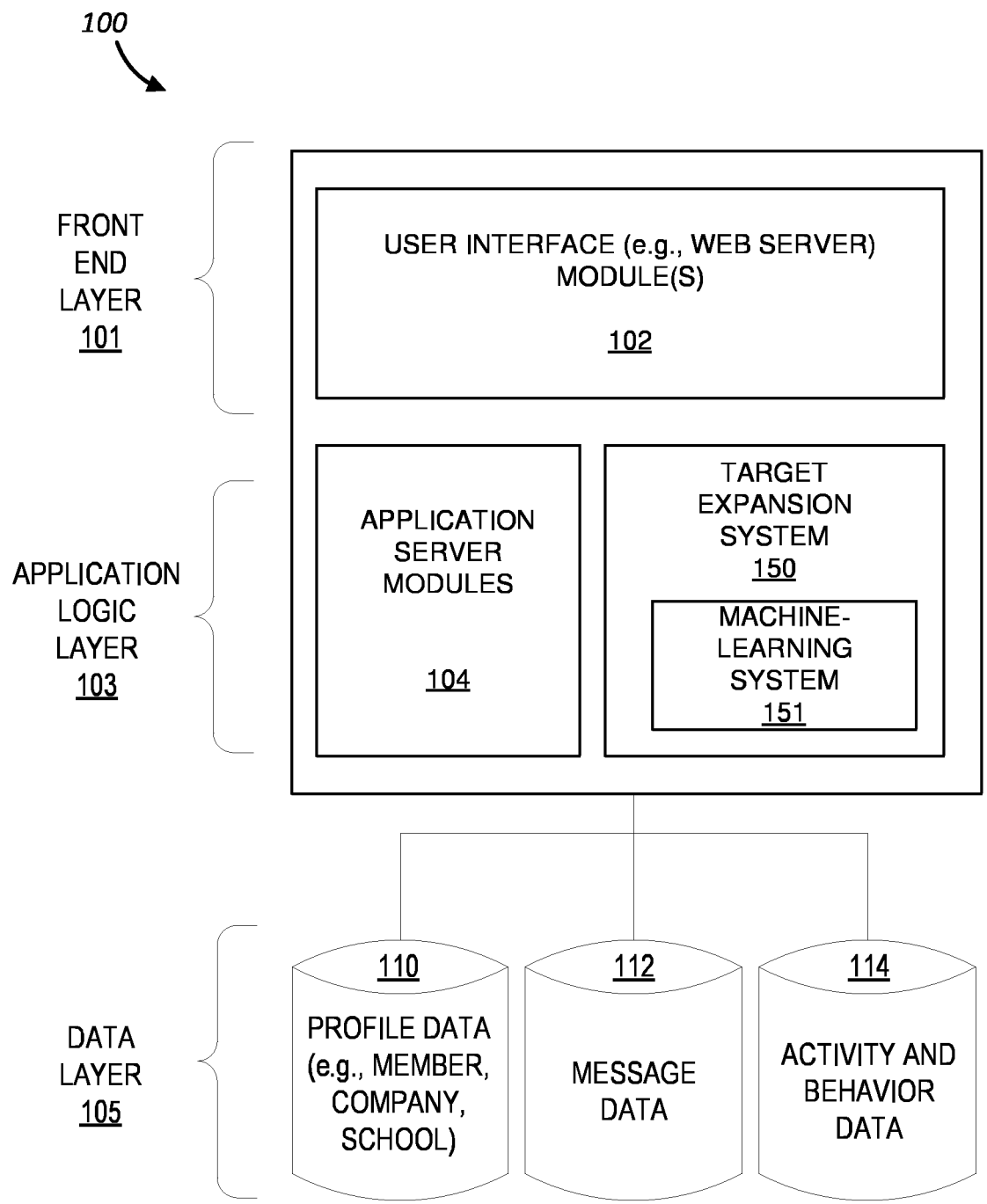
FIG. 1 is a block diagram illustrating various components or functional modules of an online social networking service, in an example embodiment.

FIG. 1 is a block diagram illustrating various components or functional modules of an online social networking service 100, in an example embodiment. The online social networking service 100 may be utilized to manage message target distribution. In one example, the online social networking service 100 includes the target expansion system 150 that performs the various message outcome probability operations described herein.

A front end layer 101 consists of a user interface module (e.g., a web server) 102, which receives requests from various client-computing devices and communicates appropriate responses to the requesting client devices. For example, the user interface module(s) 102 may receive requests in the form of Hypertext Transport Protocol (HTTP) requests, or other web-based, application programming interface (API) requests. In another example, the front end layer 101 receives requests from an application executing via a member's mobile computing device. In one example, a member submits media content to be transmitted to other members of the online social networking service 100.

An application logic layer 103 includes various application server modules 104, which, in conjunction with the user interface module(s) 102, may generate various user interfaces (e.g., web pages, applications, etc.) with data retrieved from various data sources in a data layer 105.

In some examples, individual application server modules 104 may be used to implement the functionality associated with various services and features of the online social networking service 100. For instance, the ability of an organization to establish a presence in the social graph of the online social networking service 100, including the ability to establish a customized web page on behalf of an organization, and to publish messages or status updates on behalf of an organization, may be services implemented in independent application server modules 104. Similarly, a variety of other applications or services that are made available to members of the social networking service 100 may be embodied in their own application server modules 104. Alternatively, various applications may be embodied in a single application server module 104.

In some examples, the online social networking service 100 includes the target expansion system 150, such as may be utilized to transmit messages, track user response to the messages, train a learning machine, solve a multi-objective optimization problem, and determine probability differentials as described herein. In one example embodiment, the target expansion system 150 includes a machine learning system 151 to train on a set of messages transmitted to a portion of members in a target. A target, as described herein, includes, but is not limited to, one or more members of the online social networking service 100, members of the online social networking service 100 with certain cultural characteristics, or other properties of a set of members of the online social networking service 100. In certain examples, a target includes lawyers, doctors, speakers of a certain language, males, females, children, retired members, employed members, unemployed members, members of a hobby group, members of a sexual orientation group, members of a religious group, members of a race, members of a gender, members of an age range, members in a specific geographic location, employees of a certain organization, or any other characteristic of a member of the online social networking service 100.

In one example embodiment, an administrator for the target expansion system 150 provides a set of potential targets and/or excludes targets that have already received the input message. In this example, the target expansion system 150 determines a target group is the most likely candidate for expansion based, at least in part, on the differential between the expected number of positive responses and a weight factor multiplied by the expected number of negative responses from transmitting the message to the target. As described herein, a target includes, but is not limited to, a group of members at an online social networking service. As included herein, reference may be made to a "target," "target group," or similar, each of which at least includes two or more members of the online social networking service.

As illustrated, the data layer 105 includes, but is not necessarily limited to, several databases 110, 112, 114, such as a database 110 for storing profile data, including both member profile data as well as profile data for various organizations. In certain examples, the profile data includes the properties and/or characteristics of members of the social networking service 100. Consistent with some examples, when a person initially registers to become a member of the social networking service 100, the person may be prompted to provide some personal information, such as his or her name, age (e.g., birthdate), gender, sexual orientation, interests, hobbies, contact information, home town, address, the names of the member's spouse and/or family members, educational background (e.g., schools, majors, matriculation and/or graduation dates, etc.), occupation, employment history, skills, religion, professional organizations, and other properties and/or characteristics of the member. This information is stored, for example, in the database 110. Similarly, when a representative of an organization initially registers the organization with the social network service 100, the representative may be prompted to provide certain information about the organization. This information may be stored, for example, in the database 110, or another database (not shown). With some examples, the profile data may be processed (e.g., in the background or offline) to generate various derived profile data. For example, if a member has provided information about various job titles the member has held with the same or different companies, and for how long, this information can be used to infer or derive a member profile attribute indicating the member's overall seniority level, or seniority level within a particular company. With some examples, importing or otherwise accessing data from one or more externally hosted data sources may enhance profile data for both members and organizations. For instance, with companies in particular, financial data may be imported from one or more external data sources, and made part of a company's profile.

The online social networking service 100 may provide a broad range of other applications and services that allow members the opportunity to share and receive information, often customized to the interests of the member. For example, with some examples, the online social networking service 100 may include a message sharing application that allows members to upload and share messages with other members. With some examples, members may be able to self-organize into groups, or interest groups, organized around a subject matter or topic of interest. With some examples, the online social networking service 100 may host various job listings providing details of job openings within various organizations. In one example embodiment, a member submits a message to be transmitted to other members of the online social networking service 100. The target expansion system 150 determines whether to send the message to a target and/or which targets to include in a distribution list for the message. In other example embodiments, the online social networking service 100 receives advertisements to be sent to members of the online social networking service 100. In another example embodiment, the online social networking service 100 is configured to notify members of upcoming events, activities, deadlines, promotions, upgrades, or to send a message to a member in any other way or for any other purpose. Therefore, this disclosure is not limited regarding the messages the online social networking service 100 may transmit to a member.

In another example embodiment, the target expansion system 150 stores messages in the message data database 112. The target expansion system 150 may also store any and/or all message related information in the message data database 112.

As members interact with the various applications, services, and content made available via the online social networking service 100, information concerning content items interacted with, such as by viewing, playing, and the like, may be monitored, and information concerning the interaction may be stored, for example, as indicated in FIG. 1 by the database 114. In one example embodiment, the interactions are in response to receiving a message requesting the interaction. For example, a message to the member may include a link and the interaction includes the user selecting the link. Thus, previous interactions with a content item in response to a message by a target of the online social networking service 100 may be stored and utilized in determining, among other factors, how various types of content items, such as organic content items and sponsored content items, result in differences in engagement levels with the content items by members of the online social networking service 100.

In certain examples, member interactions with the online social networking service 100 are based on a link in a message. For example, the online social networking service 100 may include a link (e.g., a universal resource located (URL)). In response to the member clicking on the link, the member then initiates an interaction with the online social networking service 100. This initial interaction, as well as subsequent interactions in the user session, may also be stored in the database 114 and associated with the message sent. Therefore, message data may also include user interactions with the online social networking service 100 based on a received message.

Although not shown, with some examples, the online social networking service 100 provides an application programming interface (API) module via which third-party applications can access various services and data provided by the online social networking service 100. For example, using an API, a third-party application may provide a user interface and logic that enables the member to submit and/or configure a set of rules used by the target expansion system 150. Such third-party applications may be browser-based applications, or may be operating system-specific. In particular, some third-party applications may reside and execute on one or more mobile devices (e.g., phone, or tablet computing devices) having a mobile operating system.

Figure 2:
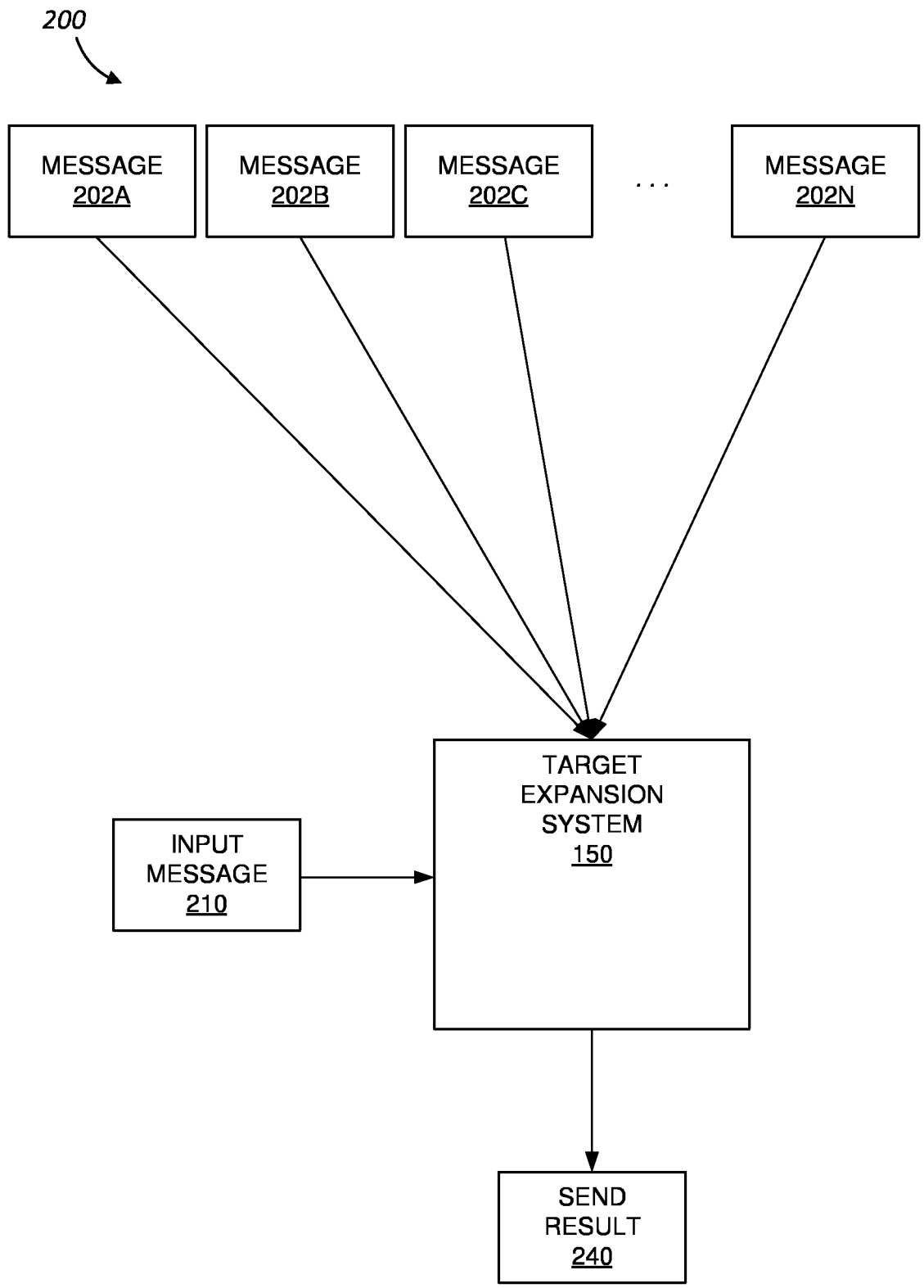
FIG. 2 is a block diagram illustrating one example scenario that includes a target expansion system according to one example embodiment.

FIG. 2 is a block diagram illustrating one example scenario 200 that includes a target expansion system 150, according to one example embodiment. According to this example, the scenario 200 includes a plurality of messages 202, the target expansion system 150, an input message 210, and a send result 240.

In one example embodiment, the online social networking service 100 transmits the messages 202 to various members of the online social networking service 100. For example, the first message 202A includes a text-based link for the member to select. In response to the member selecting the link, the target expansion system 150 tracks interactions between the user and the online social networking service 100. In one example, the member selects or views an available item.

In another example, the second message 202B includes an advertisement. In response to the member selecting to view the advertisement, the target expansion system 150 stores that the member selected the advertisement. Therefore, the database 114 (FIG. 1) may include a data record that the specific advertisement resulted in a positive interaction with the target (e.g., the user selecting the advertisement).

In one example, the third message 202C includes a link; however, the target (e.g., the member) that received the third message 202C reports that the message 202C is spam. In response, the target expansion system 150 records that the message resulted in a negative response from the member. Of course, other members may not indicate that the message is spam and this disclosure is not limited in this regard.

In another example embodiment, a member that receives the fourth message unsubscribes from a mailing list at the online social networking service 100. In this example embodiment, a negative response includes the member unsubscribing from the mailing list. In response, the target expansion system 150 stores a record in the database 114 indicating that the user unsubscribed in response to the message 202N. Although the letter 'N' in the message 202N may indicate a fourth message, this disclosure is not limited in this regard as 'N' may indicate any number of messages. In one example, the $N^{th}$ message indicates the $100^{th}$ message.

In certain embodiments, as many messages are transmitted to various members (e.g., 2% of randomly chosen members of a target group of members) of the online social networking service 100, the target expansion system 150 trains a machine-learning system 151 based on the messages 202 and either positive, negative, or no responses from members that received the messages 202. The target expansion system 150 further determines a threshold differential and a weight value using the responses to minimize a number of messages to send while satisfying one or more constraints. In certain examples, the constraints may include an expected number of positive responses exceeding a threshold value or an expected number of negative responses not exceeding a threshold value. In one example, the target expansion system 150 employs a multi-objective optimization problem to determine the threshold differential and the weight value as one skilled in the art may appreciate. In another example, the target expansion system 150 performs a grid search of data values to determine a best threshold differential and a best weight value.

As will be further described, the target expansion system 150 applies the machine-learning system 151 to generate expected numbers of either positive or negative responses, applies determined weights and/or threshold values, and determines whether, for each potential target, to send the message to the target in response to a difference between the expected number of positive responses and the weight value multiplied by the expected number of negative responses exceeding the threshold differential.

In one example embodiment, the target expansion system 150 also increases the relevancy of messages to members by not sending messages that will not likely result in positive responses from members. In other examples, the target expansion system 150 determines whether a message transmitted to a target group of members of the online social networking service 100 will likely result in positive responses that exceed a threshold number. In another example, the target expansion system 150 determines a threshold differential between likely positive responses and likely negative responses multiplied by a weight value.

In one example, the target expansion system 150 trains a machine-learning system 151 on messages transmitted to a foreign country. In response to receiving an input message 210, the target expansion system 150 determines an expected number of positive responses and an expected number of negative responses sending the input message 210 to the foreign country, or to any other target as described herein.

In other examples, as many messages that include certain terms result in more positive responses from a target, the machine-learning system 151 increases a probability that an input message 210 that includes those terms will result in a positive response from a member, as one skilled in the art may appreciate. Also, the machine-learning system 151 learns times for sending messages to the target that result in more positive responses. For example, historical messages that are transmitted at 1 AM may result in an increased number of positive responses versus similar messages that are transmitted at 12 PM. Therefore, the machine-learning system 151 also adjusts an expected number of either positive or negative responses based, at least in part, on a time when the message is transmitted.

In another example embodiment, the machine-learning system 151 also includes a location of a recipient for a message and may statistically track various geographic locations. In this way, the machine-learning system 151 adjusts expected responses based, at least in part, on the location of the recipient. For example, messages to people in the United States may result in different responses as compared with other countries. The machine-learning system 151 may track responses according to cities, counties, states, provinces, countries, continents, planets, or other spatial regions in either two or three dimensions. For example, where a target is located at a specific location, the machine-learning system 151 accounts for the location by including location in the training data.

Figure 3:
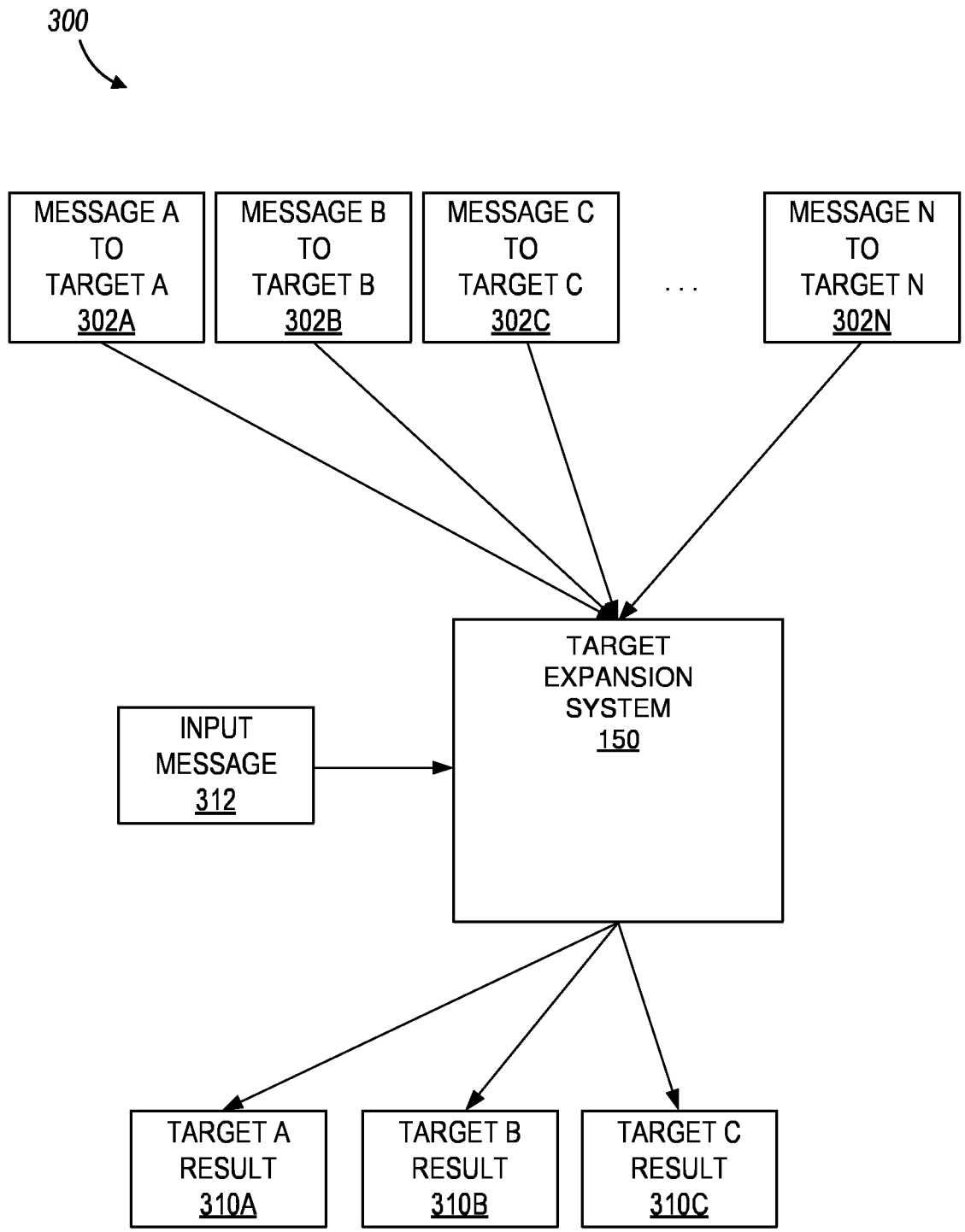
FIG. 3 is another block diagram illustrating an example scenario that includes a target expansion system according to one example embodiment.

FIG. 3 is another block diagram illustrating an example scenario that includes a target expansion system, according to one example embodiment. According to this example, the scenario 300 includes a plurality of messages 302 to respective targets, the target expansion system 150, an input message 312, and one or more target results 310. The target results 310 indicate which targets the input message 312 should be sent to. In one example, the target expansion system receives a set of potential target groups and sends message to portions of each potential target group. Based, at least in part, on the responses as described herein, the target expansion system 150 generates a target result for each potential target group and may further indicate one or more target groups to which the input message 312 should be sent.

In one example embodiment, the online social networking service 100 transmits the messages 302 to various targets of the online social networking service 100. In one example, the messages 302 are diverse in nature. Of course, they may be the same message sent to different targets, but this is a non-limiting example, and the messages 302 may be any message as described herein, or other, or the like.

In one example, the first message 302A is transmitted to a target A and the target responds positively. For example, the receiver of the text message clicks on an included link to visit a network resource. In this example, the second message 302B is transmitted to a target B and the receiver responds positively by selecting an advertisement included in the email. In this example, the third message 302C is transmitted to a target C using an application notification message and evokes a negative response from the target of the third message, and the fourth message 302N is transmitted to a target N using a user profile message. The target expansion system 150 trains the machine-learning system 151 based on the messages 302, including their respective targets, resulting in a machine-learning system 151 capable of generating an estimated number of positive response and an estimated number of negative responses from a target receiving the input message 312.

In one example embodiment, the target expansion system 150 also applies a multi-objective optimization problem for the input message and a set of potential targets to determine a weight value and a threshold differential by minimizing a number of messages to send while satisfying one or more constraints. In one embodiment, the constraints include a minimum number of positive responses. In another embodiment, the constraints include a maximum number of negative responses.

In response to receiving an input message 312, the target expansion system 150 combines the weight value, the threshold differential and the expected responses generated by the machine learning system 151 to determine whether to send the input message to each potential target. In one example embodiment, the target expansion system 150 sends the input message 312 to a target in response to the expected number of positive responses for the target being the threshold differential higher than the expected number of negative responses multiplied by the weight value.

Therefore, in certain embodiments, the target expansion system 150 determines whether to send an input message to many different targets by independently analyzing each target as described herein. In one example embodiment, the target expansion system 150 transmits the message 312 to each target where the expected number of positive responses for the input message is at least the threshold differential higher than the expected number of negative responses multiplied by the weight value.

Figure 4:
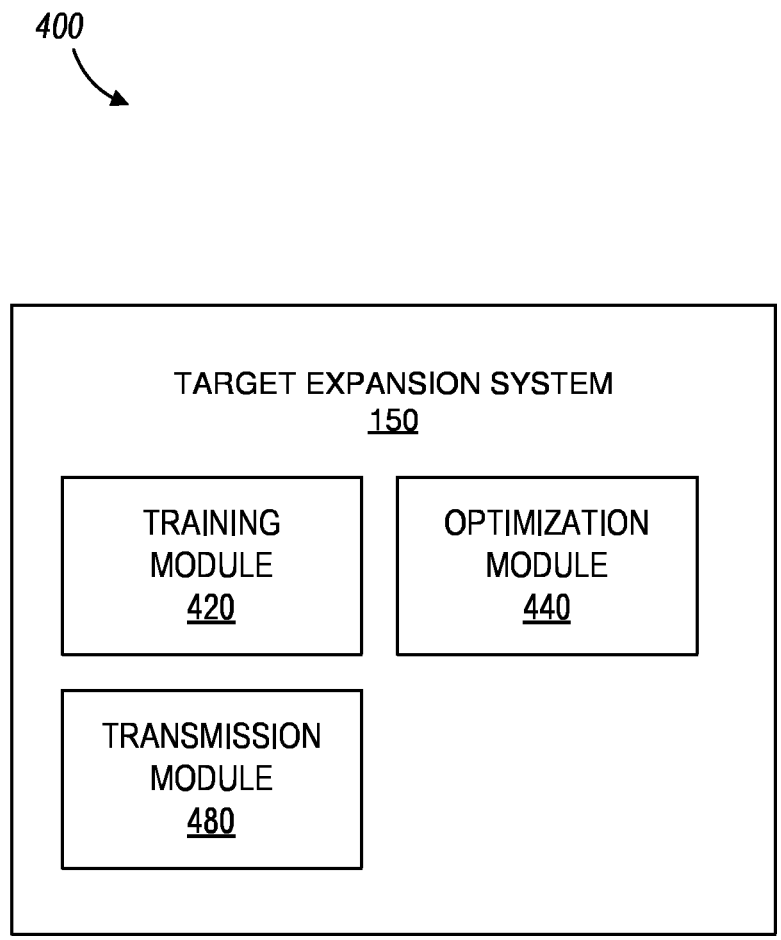
FIG. 4 is a schematic block diagram illustrating components of a target expansion system, according to one example embodiment.

FIG. 4 is a schematic block diagram 400 illustrating components of the target expansion system 150, according to one example embodiment. The target expansion system 150, in one example embodiment, includes a training module 420, an optimization module 440, and a transmission module 480.

In one example embodiment, the training module 420 configures the machine-learning system 151 to train on a plurality of messages. In one example, the training module 420 trains the machine-learning system 151 on each and every property of a message. In one embodiment, a list of message properties includes, but is not limited to, a message recipient email, a carbon copy email, a blind carbon copy email, a number of recipients, a subject, a term in the subject, a term in the body of the message, a title, a header, a font size, a font color, a font property, a font type, a length of the message, an attached file, an attached file type, an attached file size, an associated item, an associated event, an included advertisement, a message size, a signature, a priority, a tag, a message type, a maximum line length, a number of terms, a longest term, a language, delayed delivery, a reply message destination, an age of a recipient, a race of a recipient, a gender of a recipient, a response from a recipient, a number of responses from a recipient, a message in a message, a number of messages in a message, a recipient identifying the message as spam, a recipient unsubscribing from a mailing list, a recipient complaining about the message, a recipient purchasing something in response to the message, a recipient visiting a web page in response to the message, a length of a session between a recipient and a network system in response to the message, or any other property, result, or event associated with the message, or the like.

In one example embodiment, the training module 420 trains the machine-learning system 151 to output an expected number of positive responses based on a message being transmitted to a target, and an expected number of negative responses based on the message being transmitted to the target. In another example embodiment, the training module 420 trains the machine-learning system 151 using user events occurring in response to targets receiving the messages 302. In one example, a member of a target group clicks on a link in a message and visits a web page. The training module 420 includes the page view. Of course, the target may also continue interacting with the web page and the training module 420 also trains on these subsequent events. For example, the target may continue selecting pages, entering information, or otherwise interacting with the online social networking service 100. In one example embodiment, the training module 420 monitors responses from members of a target group and trains on responses for a predetermined threshold period of time starting with a first response from a user. For example, a first user may respond and the training module 420 monitors interactions from the first user for 20 minutes. Similarly, the training module 420 monitors interactions from any users that respond to a message beginning with a first response from a user, and monitoring interactions for a threshold period of time. In one specific example, the training module 420 trains on events occurring within 15 minutes of the initial page view in response to receiving the message. Of course, other time periods may be used and this disclosure is not limited in this regard. In certain embodiments, the training module 420 associates each event with the message that instigated the events.

In one embodiment, the training module 420 trains using user events (e.g., target events) based on an Internet Protocol (IP) address for the recipient. Therefore, a target may interact with a remote server using different web browsers and the training module 420 still detects the target events. In one example embodiment, a target is a recipient of the message and events initiated by the recipient are target events.

In another example embodiment, the optimization module 440 is configured to determine the weight value and the threshold differential by solving a multi-objective optimization problem for the input message and the set of potential targets. In one example, the optimization module 440 determines the weight value and the threshold differential by minimizing the number of messages to send while maintaining one or more constraints as previously described.

In one example, the optimization module is configured to minimize the number of sent messages but also ensure that the number of page views are 80% of the expected number of page views if the message is sent to all potential targets. Of course, other values may be used and this disclosure is not limited in this regard. In another example embodiment, the optimization module 440 receives a percentage of positive responses as a threshold percentage, and the optimization module 440 is configured to minimize a number of messages to send while maintaining at least the threshold percentage of positive responses.

In another example, the optimization module 440 receives threshold percentages from an administrator of the target expansion system 150. For example, the optimization module 440 may receive threshold percentages that indicate a minimum number of messages such that the number of page views remains above 85% of the expected number of page views based on the message being sent to several different potential targets, and a threshold number of negative responses is 50% of previous negative responses based on the message being sent to the different potential targets.

In another example embodiment, the optimization module 440 receives threshold values from an administrator of the target expansion system 150. For example, the optimization module 440 may be configured to minimize a number of messages to send while ensuring a number of positive responses remains above a threshold number and a number of complaints below a threshold number. In one example, the optimization module 440 minimizes a number of messages to send while ensuring number of page views above remains above 10,000 and a number of complaints below 1,000. Of course, other values may be used and this disclosure is not limited in this regard.

In certain embodiments, a positive response includes at least one of a page view, a clicked link, a purchase, a like, a comment, a click, a reference, a referral, a vote, or other response that is consistent with a request included in the message, or other response that one skilled in the art recognizes as positive. In other embodiments, a negative response includes at least one of an unsubscribe, a complaint, identifying the message as spam, a dislike, or other response that one skilled in the art would recognize as negative.

In one example embodiment, the training module 420 trains on messages transmitted on a daily basis. In one example, the training module 420 trains on the messages transmitted each day over the past week. In another example, the training module 420 trains on the most recent 100,000 messages. Of course, these values are non-limiting as any number of recent messages may be used to train the machine-learning system 151.

In one example embodiment, the probability module 460 is configured to determine whether a difference between the expected number of positive responses of a message sent to a target and the expected number of negative responses of the message sent to the target exceeds the threshold differential generated by the optimization module 440.

In one specific non-limiting example, an expected number of positive responses is represented using $R_P$, the expected number of negative responses is represented using $R_N$, S represents the weight value, T represents the threshold differential, and the equation is consistent with Equation 1.

$$R_P - S*R_N > T \qquad \text{Equation 1}$$

In this example, the optimization module 440 optimizes the weight value 'S' and the threshold differential 'T' to minimize a number of messages to send while maintaining a number of positive responses from the targets above a threshold number, and a number of negative responses below a threshold number, as previously described. In this example, the probability module 460 determines whether Equation 1 holds true for the given input message and a target pair. In one example, the expected number of positive responses $R_P$ and the expected number of negative responses $R_N$ are outputs of the machine-learning system 151 trained by the training module 420, and the threshold differential and the weight value are determined by the optimization module 440. The optimization module 440 may determine these values by either, multi-objective optimization solvers and/or a grid search approach. Of course, one skilled in the art may recognize other ways to determine an optimal weight value and threshold differential and this disclosure is meant to include all such ways.

In one example embodiment, the transmission module 480 is configured to transmit an input message to a target in response to the expected number of positive responses minus the expected number of negative responses multiplied by the weight value being greater than the threshold differential.

Figure 5:
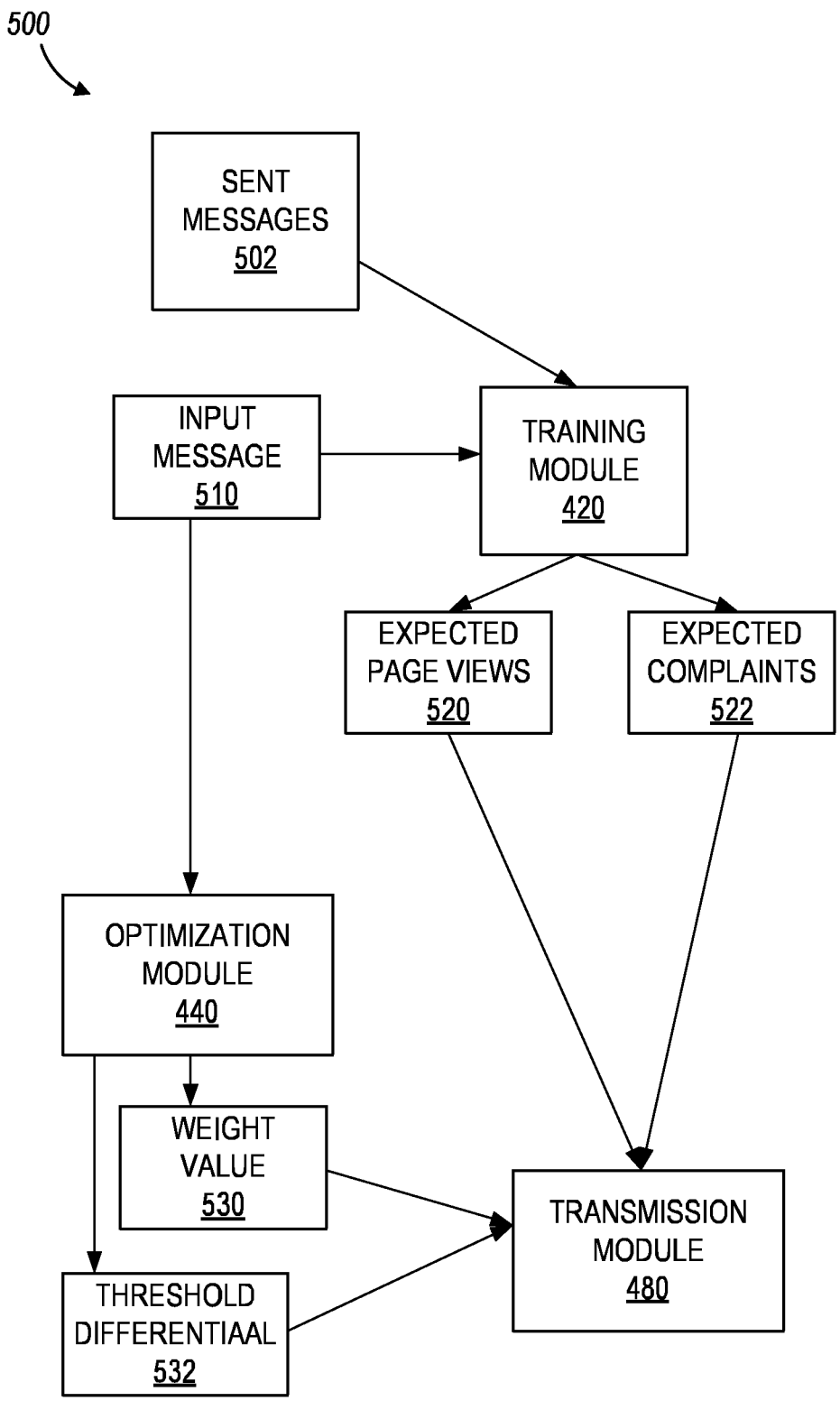
FIG. 5 is a schematic block diagram illustrating another example scenario for a target expansion system, according to an example embodiment.

FIG. 5 is a schematic block diagram illustrating another example scenario 500 for a target expansion system according to an example embodiment. In this example embodiment, the training module 420 trains on a set of sent messages 502 sent to a portion of members of a target group is configured to generate an expected number of page views 520 (one example of a positive response) for an input message 510 to a target and an expected number of complaints 522 (one example of a negative response) for the input message 510 being transmitted to a the target.

In this example scenario 500, the optimization module 440 determines a weight value 530 and a threshold differential 532 based on the expected responses from members of the set of potential targets to the input message. In one example, the optimization module 440 applies a multi-objective optimization problem to minimize a number of messages to transmit according to one or more constraints as previously described. In another example, the optimization module 440 performs grid table search as one skilled in the art may appreciate in order to determine best values for the weight value 530 and the threshold differential 532.

The transmission module 480 determines whether the expected number of page views 520 minus the weight value 530 multiplied by the expected number of complaints 522 exceeds the threshold differential 532 as indicated in Equation 1. In response to Equation 1 being true for the input message 510 and a specific target, the transmission module 480 transmits the input message 510 to the target. In response to Equation 1 not being true for the input message 510 and a specific target, the transmission module 480 drops the message.

In certain embodiments, although a multi-objective optimization problem includes the term "optimize," it is not necessary that the solution be the most optimal solution. In some embodiments, an optimized solution to the multi-objective optimization problem is merely a best solution discovered by the optimization module 440. Therefore, the solution may not be "optimal" but may simply be the best so far. The solution may further be dependent on an amount of computing resources applied to the solution. In some examples, the "optimal" solution is a local minimum or maximum. In other examples, the "optimal" solution is without a threshold error from a theoretical optimal solution. In one example, the "optimal" solution is an optimal practical solution, which may be less optimal than the optimal theoretical solution. In another example, the "optimal" solution is a point closest to a solution point on a Pareto-optimal front, as one skilled in the art may appreciate.

Figure 6:
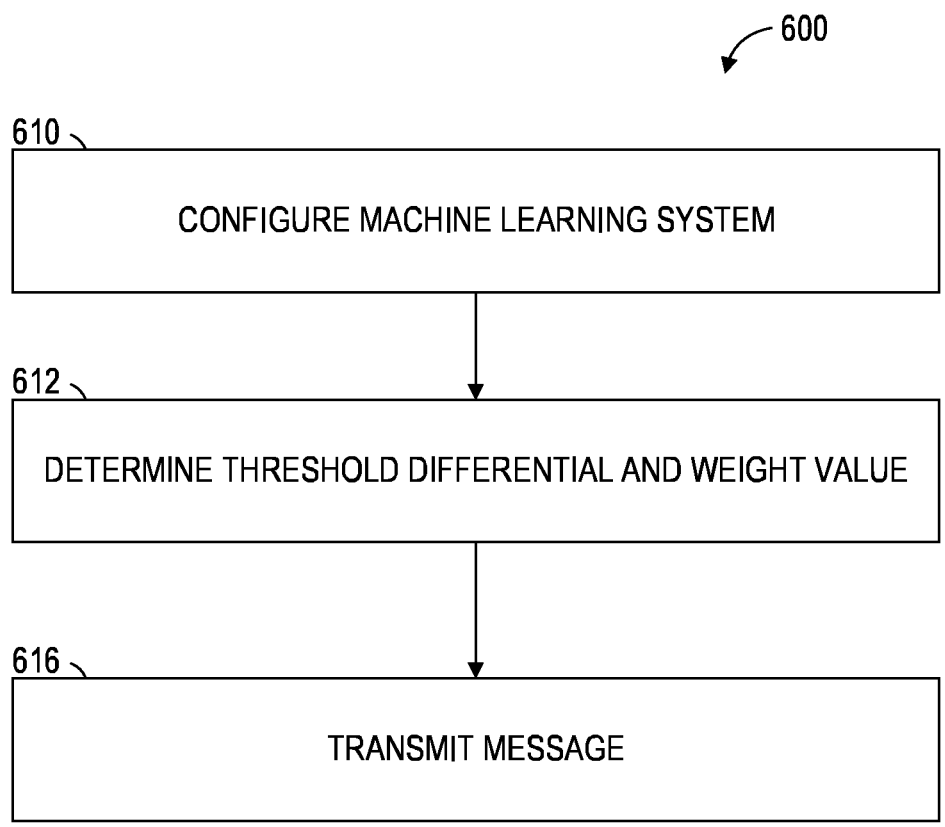
FIG. 6 is a flow chart diagram illustrating a method of expanding message targets, according to an example embodiment.

FIG. 6 is a flow chart diagram illustrating a method 600 of expanding message targets, according to an example embodiment. According to one example embodiment, operations in the method 600 may be performed by the target expansion system 150, using modules described above with respect to FIG. 4. As shown in FIG. 6, the method 600 includes operations 610, 612, and 616.

In one embodiment, the method 600 begins at operation 610 and the training module 420 configures the machine-learning system 151 to train on a plurality of messages. In another embodiment, the machine-learning system 151 outputs an expected number of positive responses based on an input message being transmitted to a different target and an expected number of negative responses based on the input message being transmitted to the target. For example, thousands or millions of messages are transmitted to targets at an online social networking service 100, and the training module 420 trains the machine-learning system 151 on the transmitted messages and responses from the targets based on the messages.

The method 600 continues at operation 612 and the optimization module 440 determines a threshold differential and a weight value using expected responses from the set of potential targets to the input message to minimize a number of messages to send while satisfying one or more constraints. As previously described, the constraints may include a minimum number of positive responses, a maximum number of negative responses, or other constraints.

The method 600 continues at operation 616 and the transmission module sends the input message to the target in response to a differential between the expected number of positive responses and the weight multiplied by the expected number of negative responses being greater than the threshold differential. In this way, the target expansion system 150 determines targets to receive a message that likely satisfies the constraints based, at least in part, on the expected responses returned by the machine-learning system 151.

Figure 7:
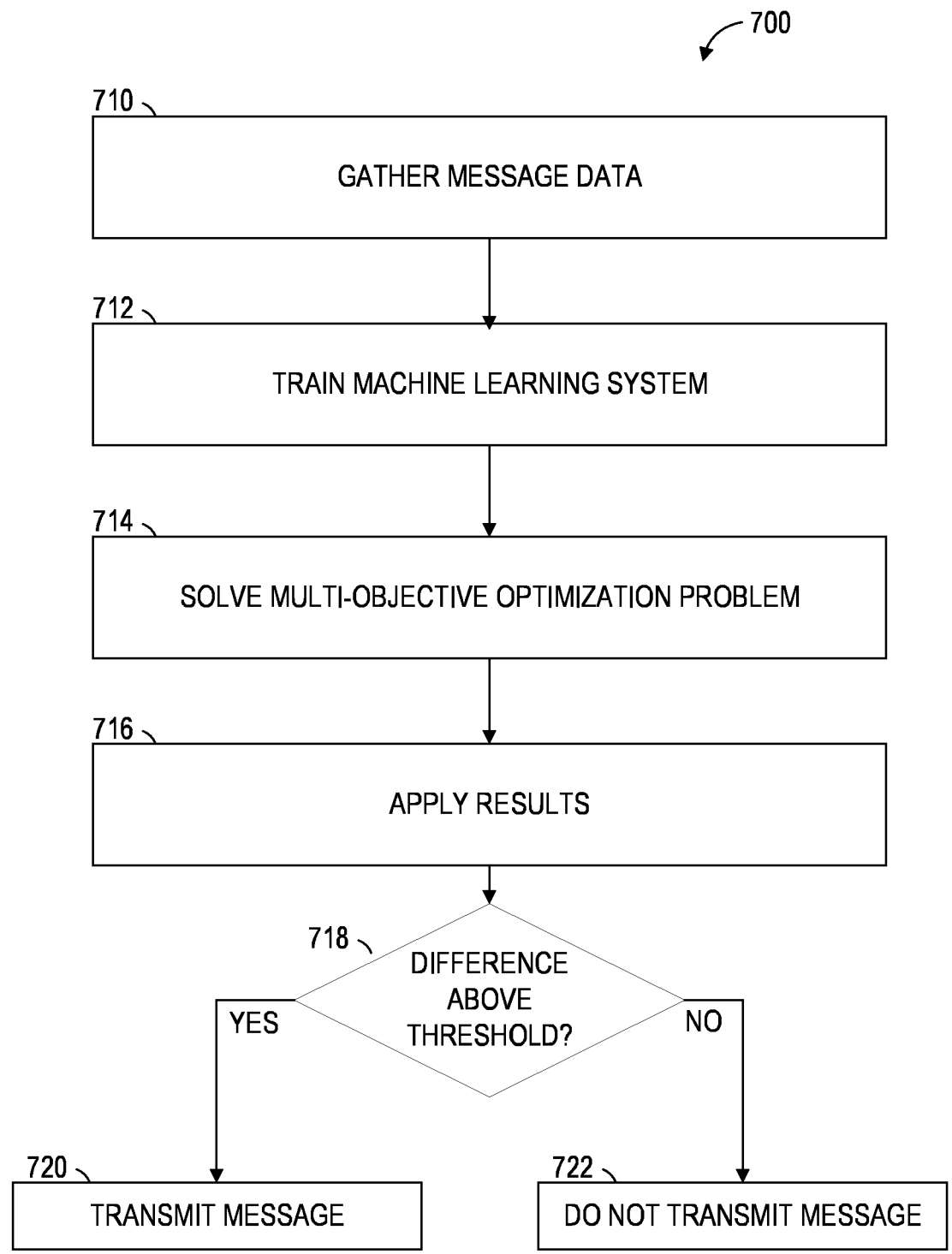
FIG. 7 is a flow chart diagram illustrating a method of expanding message targets, according to an example embodiment.

FIG. 7 is a flow chart diagram illustrating a method 700 of expanding message targets, according to an example embodiment. According to one example embodiment, operations in the method 700 may be performed by the target expansion system 150, using modules described above with respect to FIG. 4. As shown in FIG. 7, the method 700 includes operations 710, 712, 714, 716, 718, 720 and 722.

In one embodiment, the method 700 begins at operation 710 and the training module 420 gathers message data based on a set of messages transmitted to various targets of a social network. The training module 420, in one example, also gathers responses from members that are part of the targets. In one example, a link included in the message also causes notification of the training module 420 when the link is clicked, thus notifying the training module 420 when a positive response is received.

The method 700 continues at operation 712 and the training module 420 configures the machine-learning system 151 to train on the gathered message data. In another embodiment, the machine-learning system 151 outputs an expected number of positive responses based on an input message being sent to a target and an expected number of negative responses based on the input message. For example, in response to messages being transmitted to members of the online social networking service 100, the training module 420 trains the machine-learning system 151 on the transmitted messages and responses from the members based on the messages.

The method 700 continues at operation 714 and the optimization module 440 solves a multi-objective optimization problem using expected responses of the set of potential targets to the input message as previously described. In one embodiment, the optimization module 440 determines a threshold differential and a weight value for use in Equation 1. The method 700 continues at operation 716 and the transmission module 480 applies results of the solution to solve Equation 1. In one example, the transmission module 480 includes the expected number of positive responses sending the message to the target, the expected number of negative responses sending the message to the target, the threshold differential, and the weight value as represented in Equation 1.

The method 700 continues at operation 718. In response to the difference exceeding the threshold differential, the transmission module 480, at operation 720, transmits the message to the target. In response to the difference not exceeding the threshold differential, the transmission module 480, at operation 722, does not transmit the message. In one example, the transmission module 480 drops the message, or perform another action to prevent the message from being transmitted.

Figure 8:
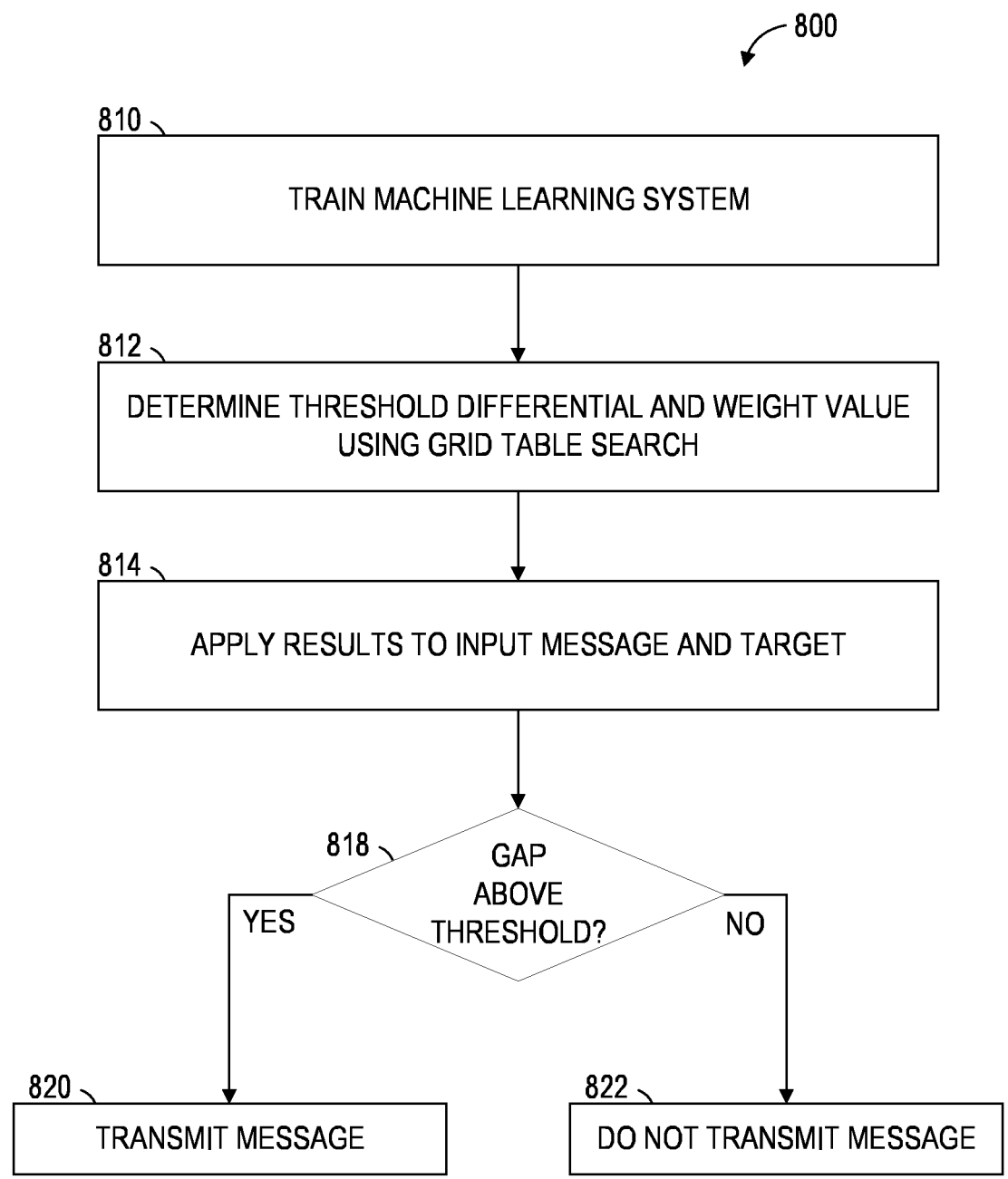
FIG. 8 is a flow chart diagram illustrating a method of expanding message targets, according to an example embodiment.

FIG. 8 is a flow chart diagram illustrating a method 800 of expanding message targets, according to an example embodiment. According to one example embodiment, operations in the method 800 are performed by the target expansion system 150, using modules described above with respect to FIG. 4. As shown in FIG. 8, the method 800 includes operations 810, 812, 814, 818, 820 and 822.

In one embodiment, the method 800 begins at operation 810 and the training module 420 configures the machine-learning system 151 to train on a plurality of messages. In another embodiment, the machine-learning system 151 outputs an expected number of positive responses based on an input message being transmitted to a target group at the online social networking service and an expected number of negative responses based on the input message being transmitted to the target group. For example, thousands or millions of messages are transmitted to members of an online social networking service (e.g., the online social networking service 100) and the training module 420 trains the machine-learning system 151 on the transmitted messages and responses from the members based on the messages.

The method 800 continues at operation 812 and the optimization module 440 performs a grid table search using expected responses to the set of potential targets to the input message to determine a threshold differential and a weight value that minimizes a number of messages to send while satisfying one or more constraints. For example, the optimization module 440 selects values for the threshold differential and the weight value and applies the threshold differential and the weight value to the set of (input message, potential target) pairs according to Equation 1. As many threshold differentials and weight value are applied in this way, the application results in many records in a table. Each record in the table includes the threshold differential, the weight value, the expected number of positive responses, and the expected number of negative responses. The optimization module 812 then searches through the records to determine the record that best minimizes the number of messages to send while meeting the constraints. Of course, one skilled in the art may recognize other ways to determine a best or optimal threshold differential and weight value and this disclosure is not limited in this regard.

The method 800 continues at operation 814 and the transmission module 480 applies the threshold differential and the weight value to an input message and target. The method 800 continues at operation 818 and the transmission module 480 determines whether a numerical gap between the expected number of positive results from the machine learning system 151 based on the input message being transmitted to the target, and the expected number of negative responses from the machine learning system 151 multiplied by the weight value.

In response to the gap exceeding the threshold differential, the method 800 continues at operation 820 and the transmission module 480 transmits the message to the target. In response to the gap not exceeding the threshold differential, the method 800 continues at operation 822 and the transmission module 480 prevents transmission of the message.

Figure 9:
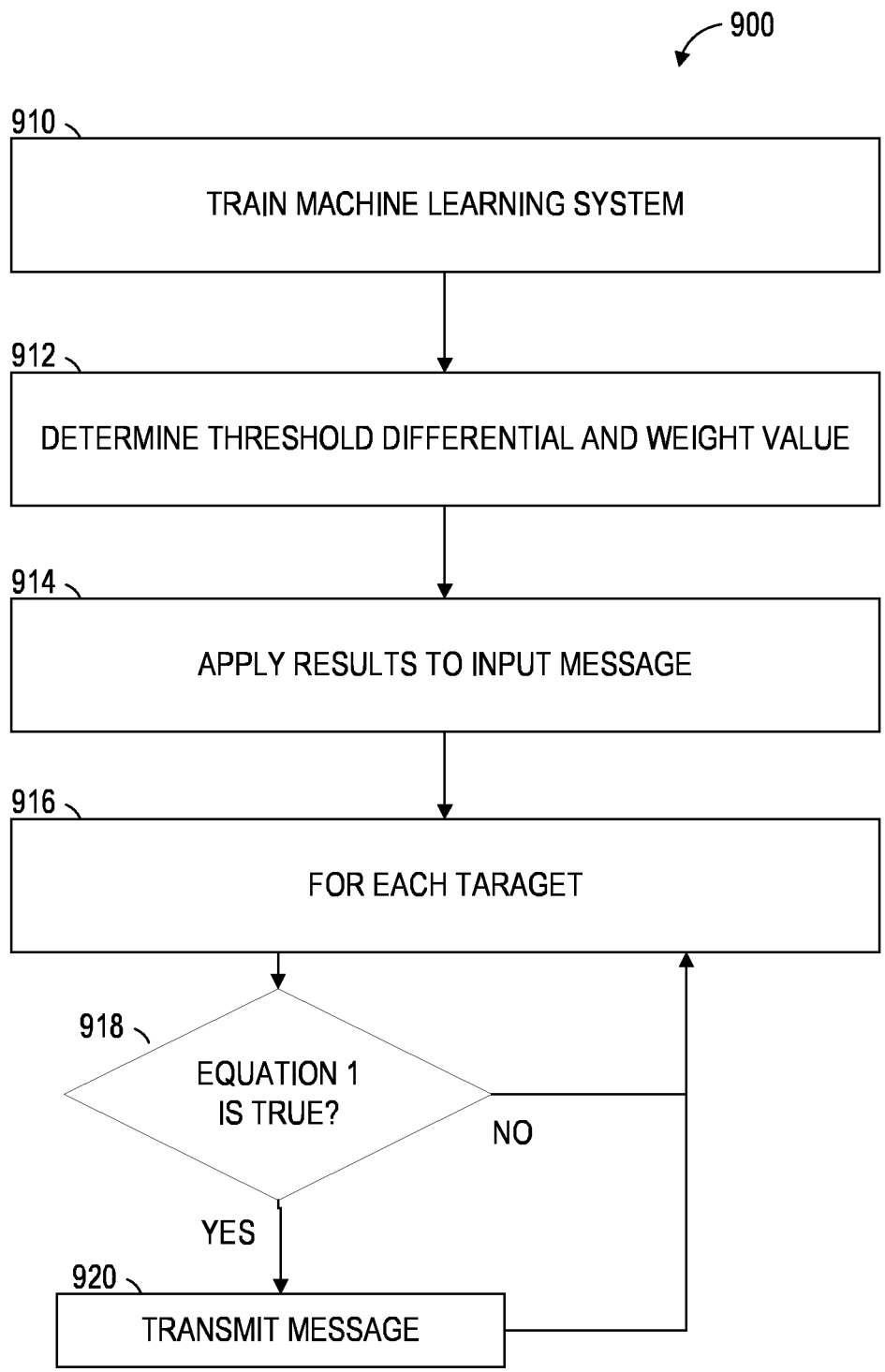
FIG. 9 is a flow chart diagram illustrating a method of expanding message targets, according to an example embodiment.

FIG. 9 is a flow chart diagram illustrating a method 900 of expanding message targets, according to an example embodiment. According to one example embodiment, operations in the method 900 are performed by the target expansion system 150, using modules described above with respect to FIG. 4. As shown in FIG. 9, the method 900 includes operations 910, 912, 914, 916, 918, and 920.

In one embodiment, the method 900 begins at operation 910 and the training module 420 configures the machine-learning system 151 to train on a plurality of messages. In another embodiment, the machine-learning system 151 outputs an expected number of positive responses for an input message to be transmitted to a target and an expected number of negative responses for the input message to be transmitted to the target. For example, thousands or millions of messages are transmitted to members of an online social networking service (e.g., the online social networking service 100) and the training module 420 trains the machine-learning system 151 on the transmitted messages and responses from the members. In certain embodiments, the messages include keywords, numbers, or other identifiers to better determine which responses are associated with which messages.

The method 900 continues at operation 912 and the optimization module 440 determines a threshold differential and a weight value using expected responses from the set of potential targets to the input message in any of the ways described herein. The method 900 continues at operation 914 and the optimization module 440 applies results from the machine learning system, the threshold differential, and the weight value to each target in a set of potential targets resulting in an expected number of positive responses and an expected number of negative responses for each target.

The method 900 continues at operation 914 and the optimization module 440 applies the threshold differential and the weight value to each of the many potential targets. For example, the optimization module 440 solves Equation 1 for each target using the threshold differential and the weight value for each target using each targets expected number of positive and negative responses.

The method 900 continues at operation 916 for each of the targets. For each target, the method 900 continues at operation 918 and the transmission module 480 determines whether Equation 1 holds true. In response to Equation 1 holding true, the method 900 continues at operation 920 and the transmission module 480 transmits the message. In response to Equation 1 not holding true, the method 900 continues at operation 916.

Figure 10:
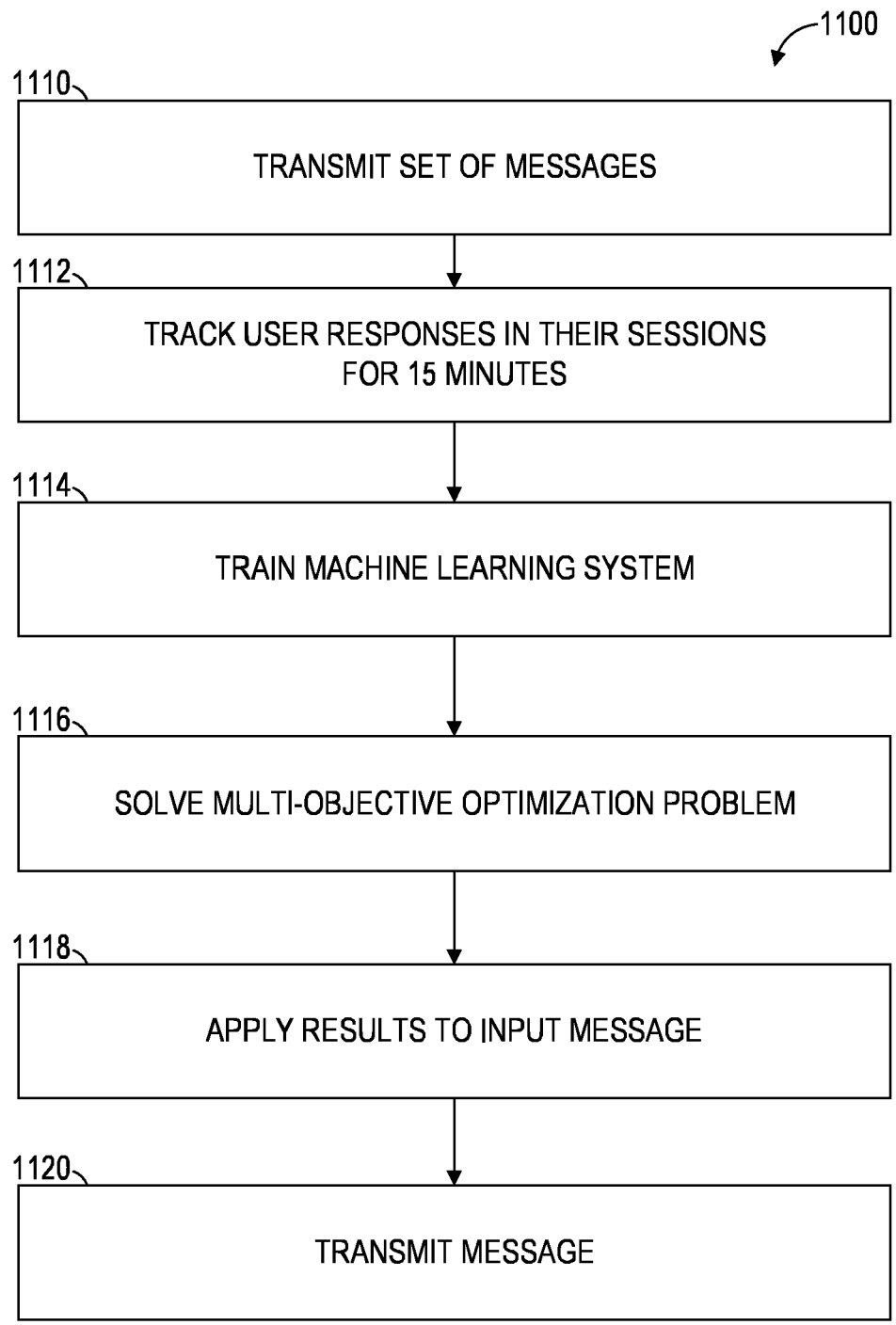
FIG. 10 is a flow chart diagram illustrating a method of expanding message targets, according to an example embodiment.

FIG. 10 is a flow chart diagram illustrating a method 1100 of expanding message targets, according to an example embodiment. According to one example embodiment, operations in the method 1100 may be performed by the target expansion system 150, using modules described above with respect to FIG. 4. As shown in FIG. 10, the method 1100 includes operations 1110, 1112, 1114, 1116, 1118, and 1120.

In one embodiment, the method 1100 begins at operation 1110 and the transmission module 480 transmits a set of messages to a random portion of members of a target group of the online social networking service 100. In certain embodiments, the messages are transmitted via at least one of email, mobile text messages, a profile message, an application notification, or the like.

The method 1100 continues at operation 1112 and the training module 420 tracks responses from the various targets in operation 1110. In certain examples, the responses include at least one of positive responses such as, but not limited to, a page view, a purchase, a like, selecting a link, or the like. In other examples, the responses include negative responses such as, but not limited to a complaint, a dislike, an unsubscribe, a poor rating, or the like.

In one embodiment, the method 1100 continues at operation 1114 and the training module 420 configures the machine-learning system 151 to train on the set of messages and their associated responses. In another embodiment, the machine-learning system 151 outputs an expected number of positive responses based on an input message and an expected number of negative responses based on an input messages. For example, thousands or millions of messages are transmitted to members of the online social networking service 100, and the training module 420 trains the machine-learning system 151 on the transmitted messages and responses from the members based on the messages.

The method 1100 continues at operation 1116 and the optimization module 440 solves a multi-objective optimization problem to determine a threshold differential and a weight value using expected responses from the set of potential targets for the input message. The method 1100 continues at operation 1118 and the transmission module 480 applies the expected number of negative responses and the expected number of positive responses with the threshold differential and the weight value as indicated in Equation 1. The method 1100 continues at operation 1120 and the transmission module 480 sends the input message to the target in response to Equation 1 holding true for the input message and the current target.

Figure 11:
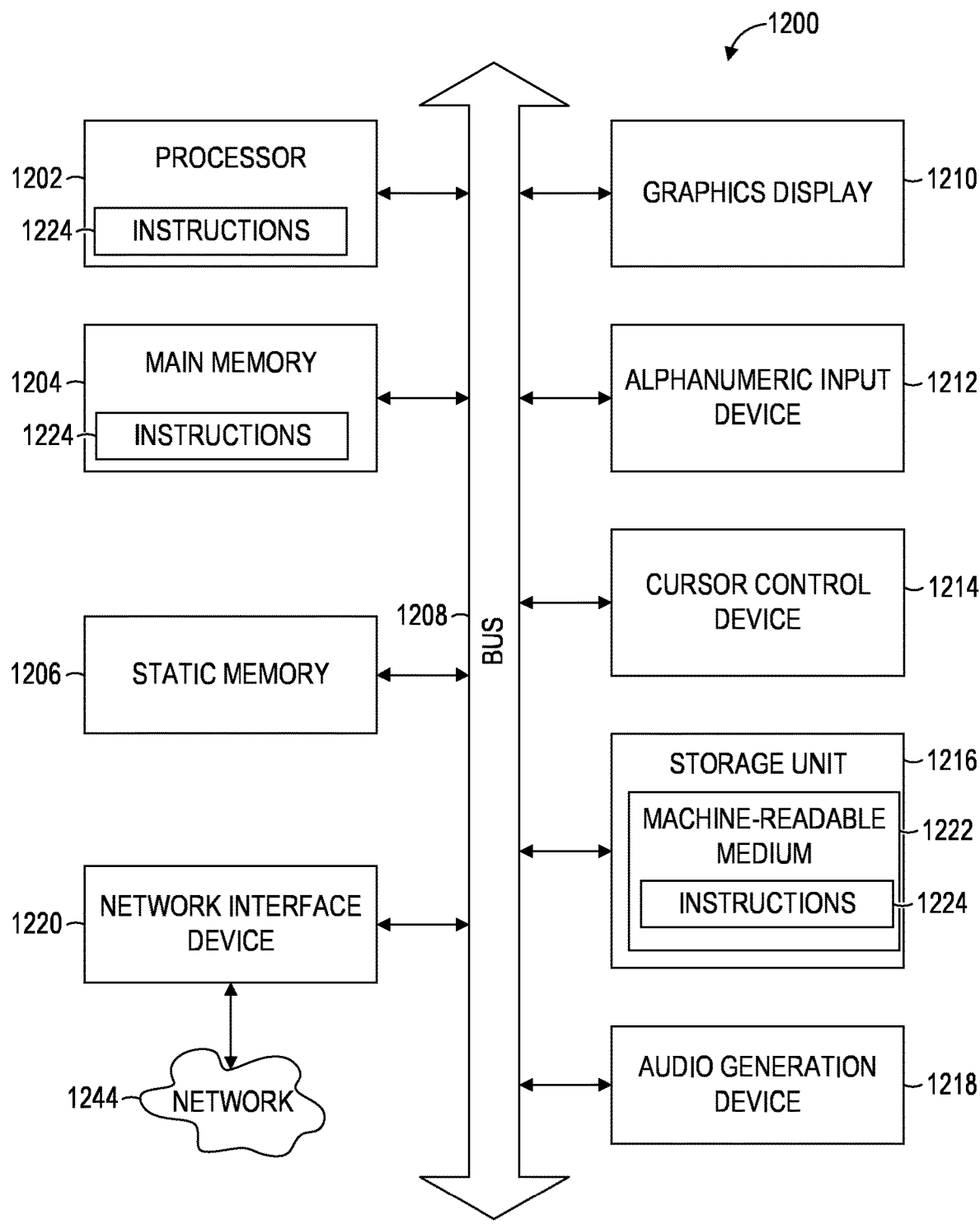
FIG. 11 is a block diagram illustrating components of a machine able to read instructions from a machine-readable medium.

FIG. 11 is a block diagram illustrating components of a machine able to read instructions from a machine-readable medium. Specifically, FIG. 11 shows a diagrammatic representation of a machine 1200 in the example form of a computer system and within which instructions 1224 (e.g., software) for causing the machine 1200 to perform any one or more of the methodologies discussed herein may be executed. In alternative embodiments, the machine 1200 operates as a standalone device or may be connected (e.g., networked) to other machines. In a networked deployment, the machine 1200 may operate in the capacity of a server machine or a client machine in a server-client network environment, or as a peer machine in a peer-to-peer (or distributed) network environment. The machine 1200 may be a server computer, a client computer, a personal computer (PC), a tablet computer, a laptop computer, a netbook, a set-top box (STB), a personal digital assistant (PDA), a cellular telephone, a smartphone, a web appliance, a network router, a network switch, a network bridge, or any machine capable of executing the instructions 1224, sequentially or otherwise, that specify actions to be taken by the machine 1200. Further, while only a single machine 1200 is illustrated, the term "machine" shall also be taken to include a collection of machines that individually or jointly execute the instructions 1224 to perform any one or more of the methodologies discussed herein. In certain embodiments, the various modules described in FIG. 4 are implemented as part of the instructions 1224.

The machine 1200 includes a processor 1202 (e.g., a central processing unit (CPU), a graphics processing unit (GPU), a digital signal processor (DSP), an application specific integrated circuit (ASIC), a radio-frequency integrated circuit (RFIC), or any suitable combination thereof), a main memory 1204, and a static memory 1206, which are configured to communicate with each other via a bus 1208. The machine 1200 may further include a graphics display 1210 (e.g., a plasma display panel (PDP), a light emitting diode (LED) display, a liquid crystal display (LCD), a projector, or a cathode ray tube (CRT)). The machine 1200 may also include an alphanumeric input device 1212 (e.g., a keyboard), a cursor control device 1214 (e.g., a mouse, a touchpad, a trackball, a joystick, a motion sensor, or other pointing instrument), a storage unit 1216, a signal generation device 1218 (e.g., a speaker), and a network interface device 1220.

The storage unit 1216 includes a machine-readable medium 1222 on which is stored the instructions 1224 (e.g., software) embodying any one or more of the methodologies, modules, or functions described herein. The instructions 1224 may also reside, completely or at least partially, within the main memory 1204, within the processor 1202 (e.g., within the processor's cache memory), or both, during execution thereof by the machine 1200. Accordingly, the main memory 1204 and the processor 1202 may be considered as machine-readable media. The instructions 1224 may be transmitted or received over a network 1244 via the network interface device 1220.

As used herein, the term "memory" refers to a machine-readable medium able to store data temporarily or permanently and may be taken to include, but not be limited to, random-access memory (RAM), read-only memory (ROM), buffer memory, flash memory, and cache memory. While the machine-readable medium 1222 is shown in an example embodiment to be a single medium, the term "machine-readable medium" should be taken to include a single medium or multiple media (e.g., a centralized or distributed database, or associated caches and servers) able to store instructions (e.g., instructions 1224). The term "machine-readable medium" shall also be taken to include any medium, or combination of multiple media, that is capable of storing instructions (e.g., software) for execution by a machine (e.g., machine 1200), such that the instructions, when executed by one or more processors of the machine (e.g., processor 1202), cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" shall accordingly be taken to include, but not be limited to, one or more data repositories in the form of a solid-state memory, an optical medium, a magnetic medium, or any suitable combination thereof.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium or in a transmission signal) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module is implemented mechanically, electronically, or any suitable combination thereof. In one example, a hardware module includes dedicated circuitry or logic that is permanently configured to perform certain operations. For example, a hardware module may be a special-purpose processor, such as a field programmable gate array (FPGA) or an ASIC. A hardware module may also include programmable logic or circuitry that is temporarily configured by software to perform certain operations. For example, a hardware module may include software encompassed within a general-purpose processor or other programmable processor. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, a processor being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API).

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or any suitable combination thereof), registers, or other machine components that receive, store, transmit, or display information. Furthermore, unless specifically stated otherwise, the terms "a" or "an" are herein used, as is common in patent documents, to include one or more than one instance. Finally, as used herein, the conjunction "or" refers to a non-exclusive "or," unless specifically stated otherwise.

What is claimed is:
1. A system comprising:
   at least one processor;
   a machine-readable storage medium having instructions stored thereon, which, when executed by the at least one processor, cause the system to:

configure a machine learning system to train on a plurality of messages transmitted to a portion of members for a first target group of an online social networking service, the machine learning system, once trained, to output an expected number of positive responses and an expected number of negative responses based on an input message being selected for transmission to a group of the online social networking service;

identify a plurality of target groups from a set of target groups for respective input messages;

for each of the plurality of target groups, determine a threshold differential and a weight value using expected responses from each respective target group, the threshold differential and weight value for use in minimizing a number of messages to send while satisfying a constraint requirement, the constraint requirement comprising a maximum number of negative responses and a minimum number of positive responses; and send the respective input message to each target group in the plurality of target groups in response to the threshold differential for the respective group being exceeded by a differential between the expected number of positive responses and a first quantity, the first quantity being the weight multiplied by the expected number of negative responses.

2. The system of claim 1, wherein each target group is selected from target groups consisting of a language group, a regional group, a cultural group, and a membership group at a network system.

3. The system of claim 1, wherein the positive responses include at least one of a response that involves a page view, a clicked link, a purchase, a like, and a comment, and the negative responses include at least one of a response that involves an unsubscribe action, a complaint, a dislike, and a spam report.

4. The system of claim 1, wherein the machine learning system is configured to train on responses for a predetermined threshold period of time starting with a first response from a user.

5. The system of claim 1, wherein determining the threshold differential and the weight value uses one of multi-objective optimization and a grid search.

6. A method comprising:

configure a machine learning system to train on a plurality of messages transmitted to a portion of members for a first target group of an online social networking service, the machine learning system, once trained, to output an expected number of positive responses and an expected number of negative responses based on an input message being selected for transmission to a of the online social networking service;

identify a plurality of target groups from a set of target groups for respective input messages;

for each of the plurality of target groups, determining a threshold differential and a weight value using expected responses from each respective target group, the threshold differential and weight value for use in minimizing a number of messages to send while satisfying a constraint requirement, the constraint requirement comprising a maximum number of negative responses and a minimum number of positive responses; and sending the respective input message to each target group in the plurality of target groups in response to the threshold differential for the respective group being exceeded by a differential between the expected number of positive responses and a first quantity, the first quantity being the weight multiplied by the expected number of negative responses.

7. The method of claim 6, wherein the plurality of messages on which the machine learning system is configured to train are messages selected from a recent period of time.

8. The method of claim 6, wherein each target group is selected from target groups consisting of a language group, a regional group, a cultural group, and a membership group at a network system.

9. The method of claim 6, wherein the positive responses include at least one of a response that involves a page view, a clicked link, a purchase, a like, and a comment, and the negative responses include at least one of a response that involves an unsubscribe action, a complaint, a dislike, and a spam report.

10. The method of claim 6, wherein the machine learning system is configured to train on responses for a predetermined threshold period of time starting with a first response from a user.

11. The method of claim 6, wherein determining the threshold differential and the weight value uses one of multi-objective optimization and a grid search.

12. A tangible machine-readable storage medium having instructions stored thereon, which, when executed by a processor, cause the processor to perform:

configuring a machine learning system to train on a plurality of messages transmitted to a portion of members for a first target group of an online social networking service, the machine learning system, once trained, to output an expected number of positive responses and an expected number of negative responses based on an input message being selected for transmission to a group of the online social networking service;

identify a plurality of target groups from a set of target groups for respective input messages;

for each of the plurality of target groups, determining a threshold differential and a weight value using expected responses from each respective target group, the threshold differential and the weight value for use in minimizing a number of messages to send while satisfying a constraint requirement, the constraint requirement comprising a maximum number of negative responses and a minimum number of positive responses; and sending the respective input message to each target group in the plurality of target groups in response to the threshold differential for each respective group being exceeded by a differential between the expected number of positive responses and a first quantity, the first quantity being the weight multiplied by the expected number of negative responses.

13. The machine-readable storage medium of claim 12, wherein determining the threshold differential and the weight value uses one of multi-objective optimization and a grid search.

14. The machine-readable storage medium of claim 12, wherein the machine learning system is configured to train on responses for a predetermined threshold period of time starting with a first response from a user.

* * * * *